United States Patent [19]

Bantel et al.

[11] 3,923,845

[45] Dec. 2, 1975

[54] RECOVERY OF PURIFIED 1-NITROANTHRAQUINONE

[75] Inventors: Karl-Heinz Bantel, Ludwigshafen; Heinz Eilingsfeld, Frankenthal; Guenter Stoeckelmann, Frankenthal-Moersch, all of Germany

[73] Assignee: Badische Anilin- & Soda-Fabrik Aktiengesellschaft, Ludwigshafen (Rhein), Germany

[22] Filed: Aug. 2, 1973

[21] Appl. No.: 384,834

[30] Foreign Application Priority Data
Aug. 2, 1972  Germany............................ 2237904

[52] U.S. Cl. ................................................ 260/369
[51] Int. Cl.² ........................................ C07C 79/37
[58] Field of Search ..................................... 260/369

[56] References Cited

UNITED STATES PATENTS

| 3,766,222 | 10/1973 | Hartwig et al. | 260/369 |
| 3,786,073 | 1/1974 | Frey et al. | 260/369 |

*Primary Examiner*—Robert Gerstl
*Assistant Examiner*—E. Jane Skelly
*Attorney, Agent, or Firm*—Johnston, Keil, Thompson & Shurtleff

[57] ABSTRACT

A process for the recovery of 1-nitroanthraquinone in a purified state from a nitroanthraquinone mixture containing it by treatment with a base in the presence of an initiator such as nitrite, halide, thiocyanate, alcoholate or phenolate ions in an organic solvent. A 1-nitroanthraquinone is obtained which is essentially pure or contains only small quantities of isomers and dinitroanthraquinones.

6 Claims, No Drawings

RECOVERY OF PURIFIED 1-NITROANTHRAQUINONE

The present invention relates to a process for the recovery of 1-nitroanthraquinone in a purified state.

Mixtures of different nitroanthraquinones are obtained by nitrating anthraquinone. Mono-nitration does not occur consistently and 1-nitroanthraquinone can only be obtained contaminated with 2-nitroanthraquinone and various dinitro compounds. Nitration in concentrated sulfuric acid leads as a rule to products which contain about 60 to 75% of 1-nitroanthraquinone.

As the tinctorial properties of the dyes produced from reaction products of 1-nitroanthraquinone are often adversely affected by impurities present in the starting material, it is desirable to start with a 1-nitroanthraquinone which is as pure as possible.

The object of the present invention is to recover purified 1-nitroanthraquinone from anthraquinone nitration products such as those which have been obtained by known nitration processes.

It has now been found that 1-nitroanthraquinone can be recovered in good yield and excellent purity from nitroanthraquinone mixtures containing it by treating the 1-nitroanthraquinone-containing nitroanthraquinone mixture in an organic solvent, which may contain up to 10% by weight of water, with a base in the presence of a catalytic amount of an initiator.

By means of this treatment undesirable byproducts from the nitration are converted into readily soluble compounds and can therefore be separated from the unconverted 1-nitroanthraquinone. It is surprising that the reaction is more or less confined to the dinitroanthraquinones. Mononitroanthraquinones are not attacked or are attacked by only a very small extent. If a suitable solvent is used the small amounts of 2-nitroanthraquinone which may be present in the nitroanthraquinone mixture remain in the mother liquor, so that a very pure 1-nitroanthraquinone can be isolated in a high yield.

Nitroanthraquinone mixtures which are subjected to purification by the process of the invention can for example be mixtures obtainable by conventional nitration processes, which mixtures contain as a rule only up to 75% by weight of 1-nitroanthraquinone. Mixtures with higher 1-nitroanthraquinone concentrations can naturally be purified even more readily.

Suitable initiators for use in the process of the invention include compounds which provide nitrite, thiocyanate, iodide, bromide, chloride, fluoride, phenolate or alcoholate ions under the reaction conditions. Compounds which, under the reaction conditions, provide such ions are for example: alkali metal and alkaline earth metal nitrites such as sodium, potassium, magnesium or calcium nitrite; alkali metal thiocyanate, such as sodium or potassium thiocyanate; alkali metal and alkaline earth metal halides such as sodium, potassium, lithium, magnesium or calcium iodide, sodium, potassium, lithium, magnesium, strontium or calcium bromide, sodium, potassium, lithium, magnesium or calcium chloride or sodium, potassium, lithium or magnesium fluoride; alkali metal and alkaline earth metal phenolates and alkali metal and alkaline earth metal alcoholates such as sodium, potassium, lithium, magnesium or calcium phenolate or sodium, potassium, magnesium or calcium methylate, ethylate, propylate or butylate; and phenol.

The compounds which provide the initiators are charged to the reaction mixture in catalytic amounts. By "catalytic amounts" in the context of the present invention amounts of from 0.1 to 10% by weight, based on the nitroanthraquinone mixture, are meant.

The nitrite ion ($NO_2-$) is the preferred initiator. Nitrite ions can still be present in the nitroanthraquinone mixture from its synthesis, if the nitroanthraquinone mixture is not washed or only incompletely washed after separation from the reaction mixture.

Furthermore, the catalyzing nitrite ion can be formed within a short time in the reaction mixture in the presence of very reactive primary or secondary amines or very reactive phenolates or alcoholates. That is to say, the reaction starts after a relatively short incubation period. On the other hand, when the initiator is added the reaction starts immediately without an incubation period.

Suitable bases for the process of the invention include primary, secondary and tertiary aliphatic, cycloaliphatic, araliphatic, aromatic and heterocyclic amines, mixtures of two or more of these amines, alkali metal and alkaline earth metal hydroxides, alkali metal carbonates, ammonium carbonate, alkali metal phosphates, and alcoholates and phenolates of alkali metals and alkaline earth metals.

Examples of individual bases which may be used are n-propylamine, isopropylamine, n-butylamine, isobutylamine, 2-methoxyethylamine, 2-ethylhexylamine, 2-ethoxyethylamine, 3-methoxypropylamine, cyclohexylamine, benzylamine, phenylethylamine, aminomethylcyclopentylamine, di-n-propylamine, diisopropylamine, morpholine, di-n-butylamine, diisobutylamine, trimethylamine, triethylamine, tripropylamine, di-2-ethylhexylamine, N-butyl-2-ethylhexylamine, di-2-methoxyethylamine, 3-cyclohexylaminopropylamine, 1-diethylamino-4-aminopentane, 3-dimethylaminopropylamine, 2-diethylaminoethylamine, pyrrolidine, piperazine, N-methylpiperazine, tributylamine, triethanolamine, pyridine, N,N-dimethylaniline, N,N-diethylaniline, N-methylmorpholine, N-ethylpiperidine, methyldiisopropylamine, methyldiisobutylamine, tetramethylhexamethylenediamine, sodium, potassium and ammonium carbonate, alkali metal phenolates such as sodium, potassium or lithium phenolate, trisodium phosphate, tri-potassium phosphate, disodium phosphate, dipotassium phosphate, sodium hydroxide and potassium hydroxide. The fluoride ion, $F^-$, acts as a strong base in polar aprotic solvents such as N,N-dialkyl carboxylic amides.

Particularly preferred amongst the bases mentioned are tertiary aliphatic amines such as trimethylamine, triethylamine, tripropylamine, tributylamine and triethanolamine, secondary amines such as diisopropylamine, diisobutylamine and morpholine, N,N-dimethylaniline, N,N-diethylaniline, alkali metal phenolates such as sodium and potassium phenolate and alkali metal carbonates such as sodium and potassium carbonate.

The amount of base which is required for the process of the invention depends on the type and, above all, on the amount of impurity to be removed. The optimum amount of base can be determined in a simple preliminary test in which the starting material is examined by thin-layer chromatography. Advantageously from 0.3 to 3, preferably from 0.5 to 2, moles of base are used for each mole of dinitro compound in the nitroanthraquinone mixture.

Suitable solvents for the treatment of the nitroanthraquinone mixture are organic solvents which optionally contain up to 10% by weight of water. As a rule the solvent for use in the process is chosen so that the desired 1-nitroanthraquinone is as insoluble as possible and the products produced by the treatment are as soluble as possible.

It has been found that such solvents include, above all, halogenated aliphatic and aromatic hydrocarbons such as methylene chloride, chloroform, carbon tetrachloride, 1,1 and 1,2-dichloroethane, trichloroethane, tetrachloroethane, tetrachloroethylene, dichloropropane, dibromoethane, chlorobenzene, dichlorobenzene, trichlorobenzene, bromobenzene, or chloronapthalene, and carboxylic amides, above all the amides of propionic acid, acetic acid and particularly formic acid and N-methylpyrrolidone. Also suitable are, for example, anisole, nitrobenzene, dimethylsulfoxide, hexamethylphosphoric triamide and benzonitrile. Preferred solvents are N,N-dimethylpropionamide, N,N-dimethylformamide, N-methylpyrrolidone, 1,1- and 1,2-dichloroethane, dichloropropane, anisole, nitrobenzene, chlorobenzene, chloronaphthalene and mixtures of two or more thereof.

The amount of solvent used is governed principally by the solubility of the reaction products resulting from the dinitroanthraquinones on treatment with the bases. As a rule the amount used is from one half to 10 times the weight of the nitroanthraquinone mixture. When carrying out the process on a technical scale the amount of solvent is kept as low as possible for economic reasons, so that a high space-time yield of purified 1-nitroanthraquinone is achieved and the amount of the 1-nitroanthraquinone dissolved in the solvent is as small as possible.

The reaction is in general carried out at temperatures from 40° to 250°, the preferred temperature range being from 70° to 150°C. At temperatures below 70°C the reaction time will normally be prolonged, whereas at temperatures above 150°C there is a risk that unwanted byproducts will be formed.

The process of the invention is advantageously carried out by heating the mixture of nitroanthraquinones, base, initiator and solvent to the desired reaction temperature whilst stirring and allowing it to cool to room temperature after the end of the reaction. The purified 1-nitroanthraquinone may be separated from the reaction mixture in a known manner, freed from mother liquor by washing and, if necessary, dried.

The nitroanthraquinone mixture can be used in a dry, finely divided form or in the form of a moist, water-containing material. If it is desired to carry out the treatment of the moist material in a non-aqueous medium, the adhering water may be removed by washing with a low-boiling water-miscible solvent and the low-boiling solvent is then optionally distilled off from the higher boiling reaction medium. The moist nitroanthraquinone mixture can also be dried by distilling off the water as azeotrope and then carrying out the treatment according to the invention in the same solvent.

When solvents which are miscible with water are used, the purification can be carried out without harmful effect in the presence of up to 20% by weight of water, based on the nitroanthraquinone mixture.

The 1-nitroanthraquinone obtained by the process of the invention can be reduced by conventional methods to 1-aminoanthraquinone. Because of its superior purity the 1-aminoanthraquinone obtained this way is available without restriction for the production of dyes and dye precursors.

The mother liquor can be worked up in a known manner so that the conversion products of the dinitroanthraquinones are obtained as a residue. In contrast to the dinitroanthraquinones themselves, the conversion products obtainable as residue can be burnt in conventional incinerators. This is a further advantage of the process according to the invention.

The following Examples illustrate the process. The parts and percentages are by weight.

EXAMPLE 1

25 parts of nitroanthraquinone mixture (containing about 75% 1-nitroanthraquinone, about 3 to 5% 1,5—, 3 to 5% 1,8- and a total of 10% 1,6—, 1,7— and 2,7-dinitroanthraquinone, 2-nitroanthraquinone and anthraquinone), 25 parts of N,N-dimethylformamide, 5 parts of triethylamine and 0.25 parts of sodium nitrite were heated for 3 hours at 105° to 110°C, the resulting mixture cooled to 20°C and suction-filtered and the residue washed with small amounts of N,N-dimethylformamide and methanol. 16.5 parts of pure 1-nitroanthraquinone were obtained.

To determine the purity the 1-nitroanthraquinone was reduced to 1-aminoanthraquinone and this was analyzed by thin-layer chromatography (silica gel, toluene/acetic acid/pyridine (20:2:1) as developer). Practically no other components were to be seen in the chromatogram.

EXAMPLE 2

Example 1 was repeated except for the use of 1 part of sodium nitrite instead of 0.25 part.

Yield: 15.1 parts of pure 1-nitroanthraquinone.

EXAMPLE 3

25 parts of a 75% 1-nitroanthraquinone, 25 parts of dimethylformamide, 5 parts of tripropylamine and 5 parts of phenol were heated for 2 hours at 130°C. After cooling to 20°C the mixture was suction filtered. 15.5 parts of pure 1-nitroanthraquinone were obtained.

EXAMPLE 4

25 parts of a nitroanthraquinone mixture (75% 1-nitroanthraquinone), 5 parts of triethylamine, 0.5 part of morpholine and 25 parts of dimethylformamide were heated for 3 hours at 110°C and the mixture was suction-filtered after cooling to 20°C. 16.5 parts of pure 1-nitroanthraquinone were obtained.

EXAMPLE 5

25 parts of a nitroanthraquinone mixture (75% 1-nitroanthraquinone), 25 parts of dimethylformamide, 5 parts of triethylamine and 0.3 part of sodium methylate were heated for 3 hours at 110°C. 14.5 parts of pure 1-nitroanthraquinone were obtained.

EXAMPLE 6

25 parts of a nitroanthraquinone mixture (75% 1-nitroanthraquinone), 30 parts of nitrobenzene, 0.2 parts of sodium nitrite and 5 parts of tripropylamine were stirred for 3 hours at 110° to 120°C. After cooling, the mixture was suctionfiltered and the residue washed with a little cold methanol. 15 parts of 1-nitroanthraquinone were obtained.

EXAMPLE 7

50 parts of a nitroanthraquinone mixture (75% 1-nitroanthraquinone), 50 parts of N,N-dimethylformamide, 10 parts of triethylamine and 5 parts of sodium chloride were stirred for 3 hours at reflux temperature. After cooling to room temperature, the mixture was suction-filtered and the residue washed with a little N,N-dimethylformamide and methanol.

Yield: 32.6 parts of pure 1-nitroanthraquinone.

EXAMPLE 8

Example 7 was repeated except that instead of triethylamine the same amount of trimethylamine was used and instead of sodium chloride 1 part of sodium thiocyanate was used. 23.5 parts of pure 1-nitroanthraquinone were isolated.

EXAMPLE 9

50 parts of a nitroanthraquinone mixture (75% 1-nitroanthraquinone) were added at 150°C to 50 parts of N,N-dimethylformamide, 2 parts of phenol and 1.4 parts of potassium carbonate and stirred for 5 minutes at 150°C. After cooling, the mixture was worked up as described in Example 1.

Yield: 29 parts of pure 1-nitroanthraquinone.

EXAMPLE 10

Example 1 was repeated except that a nitroanthraquinone mixture containing 65% 1-nitroanthraquinone was used.

Yield: 15 parts of pure 1-nitroanthraquinone.

EXAMPLE 11

50 parts of a nitroanthraquinone mixture (75% nitroanthraquinone), 50 parts of dimethylformamide, 7 parts of N,N-dimethylaniline and 1.0 part of sodium nitrite were stirred for 2 hours at 120°C. After cooling at room temperature, the mixture was suction-filtered and the residue washed with a little dimethylformamide and then with methanol.

Yield: 33 parts of pure 1-nitroanthraquinone.

EXAMPLE 12

Example 11 was repeated, except that 5 parts of morpholine were used instead of N,N-dimethylaniline, only 0.5 parts of sodium nitrite was used and the reaction conditions were 3 hours at 130°C.

Yield: 28 parts of pure 1-nitroanthraquinone.

EXAMPLE 13

27.8 parts of a moist nitroanthraquinone mixture (water content 10%), which contained in the dry state 75% 1-nitroanthraquinone, 3 to 5% 1,5-, 3 to 5% 1,8-, and a total of 10% 1,6-, 1,7- and 2,7-dinitroantraquinone, 2-nitroanthraquinone and anthraquinone, 30 parts of N,N-dimethylformamide, 5 parts of triethylamine and 0.25 part of sodium nitrite were reacted and worked up according to the procedures described in Example 1.

Yield: 17.3 parts of pure 1-nitroanthraquinone, which contained no other compounds, according to a chromatographic examination.

EXAMPLE 14

50 parts of nitroanthraquinone mixture (75% 1-nitroanthraquinone), 50 parts of N-methylpyrrolidone, 7.5 parts of 3-methoxypropylamine and 0.5 part of sodium nitrite were stirred for 3 hours at 110°C. After cooling, the mixture was worked up as described in Example 1.

Yield: 28.3 parts of 1-nitroanthraquinone, which contained only a small amount of 1,5-dinitroanthraquinone according to a thin-layer chromatogram.

EXAMPLE 15

50 parts of a nitroanthraquinone mixture (75% 1-nitroanthraquinone), 50 parts of anisole, 10.5 parts of 2-ethylhexylamine and 0.5 part of sodium nitrite were stirred for 3 hours at 100°C. The mixture was worked up as described in Example 1.

Yield 32.3 parts of pure 1-nitroanthraquinone.

EXAMPLE 16

50 parts of a nitroanthraquinone mixture (75% 1-nitroanthraquinone), 50 parts of chlorobenzene, 10.5 parts of 2-ethylhexylamine and 0.5 part of sodium nitrite were stirred for 3 hours at 100°C. The mixture was worked up as described in Example 1.

Yield: 33.7 parts of 1-nitroanthraquinone, which contained only a small amount of 1,5-dinitroanthraquinone according to a thin-layer chromatogram.

We claim:

1. A process for the recovery of 1-nitroanthraquinone in a purified state from a crude nitroanthraquinone mixture containing dinitroanthraquinones and at least 60% by weight of said 1-nitroanthraquinone, which process comprises:

heating said crude mixture at 70° to 150°C. in one-half to 10 times its weight of an organic solvent which may contain up to 10% by weight of water and is selected from the group consisting of halogenated aliphatic or aromatic hydrocarbons, anisole, nitrobenzene, N,N-dimethylpropionamide, N,N-dimethylformamide, N-methylpyrrolidone, dimethylsulfoxide, hexamethylphosphoric triamide and benzonitrile, with a base consisting essentially of 0.3 to 3 moles per mole of dinitroanthraquinone of a tertiary amine selected from the group consisting of trimethylamine, triethylamine, tripropylamine, tributylamine, triethanolamine, pyridine, N,N-dimethylaniline, N,N-diethylaniline, N-methylmorpholine, N-ethylpiperidine, N-methyldiisopropylamine, N-methyldiisobutylamine and tetramethylhexamethylendiamine in the presence of 0.1 to 10% by weight, with reference to the crude mixture, of an initiator selected from the group consisting of alkali metal nitrite, alkaline earth metal nitrite, alkali metal thiocyanate, alkali metal halides and alkaline earth metal halides;

cooling the reaction mixture after completion of the reaction; and separating the pure 1-nitroanthraquinone from the reaction mixture.

2. A process as claimed in claim 1 wherein the initiator is selected from the group consisting of sodium nitrite, potassium nitrite, magnesium nitrite, calcium nitrite, sodium thiocyanate, potassium thiocyanate, sodium bromide, potassium bromide, lithium bromide, magnesium bromide, strontium bromide, calcium bromide, sodium chloride, potassium chloride, lithium chloride, magnesium chloride, calcium chloride, sodium fluoride, potassium fluoride, lithium fluoride and magnesium fluoride.

3. A process as claimed in claim 1 wherein an alkali metal nitrite is used as an initiator.

4. A process as claimed in claim 1 wherein N,N-dimethylformamide, N,N-dimethylpropionamide, N-methylpyrrolidone, 1,1-dichloroethane, 1,2-dichloroethane, dichloropropane, anisole, nitrobenzene, chlorobenzene or chloronaphthalene is used as solvent.

5. A process as claimed in claim 1 wherein trimethylamine, triethylamine, tripropylamine, tributylamine, triethanolamine, N,N-dimethylaniline or N,N-diethylaniline is used as tertiary amine.

6. A process as claimed in claim 1 wherein the amount of tertiary amine as the base heated with said crude mixture is about 0.5 to 2 moles per mole of dinitroanthraquinone.

* * * * *